United States Patent
Su et al.

(10) Patent No.: US 11,565,233 B2
(45) Date of Patent: *Jan. 31, 2023

(54) INTEGRATED TUBULAR REACTION DEVICE

(71) Applicant: ZHUHAI ASTROBIO BIOTECHNOLOGY CO, LTD., Zhuhai (CN)

(72) Inventors: Xing Su, Zhuhai (CN); Kaiyuan Wu, Zhuhai (CN)

(73) Assignee: ZHUHAI ASTROBIO BIOTECHNOLOGY CO, LTD., Zhuhai (CN)

( * ) Notice: Subject to any disclaimer, the term of this patent is extended or adjusted under 35 U.S.C. 154(b) by 359 days.

This patent is subject to a terminal disclaimer.

(21) Appl. No.: 16/648,316

(22) PCT Filed: Sep. 14, 2018

(86) PCT No.: PCT/CN2018/105633
§ 371 (c)(1),
(2) Date: Mar. 18, 2020

(87) PCT Pub. No.: WO2019/052521
PCT Pub. Date: Mar. 21, 2019

(65) Prior Publication Data
US 2020/0215512 A1    Jul. 9, 2020

(30) Foreign Application Priority Data
Sep. 18, 2017   (CN) .......................... 201710841427.8

(51) Int. Cl.
*B01J 19/00* (2006.01)
*B01J 19/24* (2006.01)
(Continued)

(52) U.S. Cl.
CPC ....... *B01J 19/2415* (2013.01); *B01J 19/0046* (2013.01); *B01J 19/0073* (2013.01)

(58) Field of Classification Search
CPC .... B01J 19/00; B01J 19/0046; B01J 19/0053; B01J 19/0073; B01J 19/24; B01J 19/2415;
(Continued)

(56) References Cited

U.S. PATENT DOCUMENTS

| 6,405,759 | B1 * | 6/2002 | Boeye | C03C 25/12 |
| | | | | 137/893 |
| 2011/0313143 | A1 * | 12/2011 | Martin | G01N 30/6091 |
| | | | | 422/534 |
| 2020/0216875 | A1 * | 7/2020 | Su | B01L 3/50853 |

FOREIGN PATENT DOCUMENTS

CN        104195040 A   * 12/2014 ............. B01L 3/502

OTHER PUBLICATIONS

Machine translation of CN 104195040 A, published on Dec. 10, 2014 (Year: 2014).*

* cited by examiner

*Primary Examiner* — Natasha E Young
(74) *Attorney, Agent, or Firm* — Dave Law Group LLC; Raj S. Dave

(57) ABSTRACT

The invention relates to an integrated tubular reaction device, which comprises a reaction vessel, a reaction vessel including at least two tubular chambers, a channel connecting at least two tubular chambers and an opening; a cover body, which can be worked with the opening, and a cover body including a through hole; a seal, which includes a sealing plug which can be worked with the through hole. The integrated tubular reaction device solves the problem of contamination of reaction products in the process of multiple or multi-step biological enzyme reaction, and can realize (Continued)

multiple or multi-step biological enzyme reactions in the same device.

18 Claims, 3 Drawing Sheets

(51) Int. Cl.
*B01L 3/00* (2006.01)
*B01L 7/00* (2006.01)

(58) Field of Classification Search
CPC .......... B01J 2219/00; B01J 2219/00274; B01J 2219/00279; B01J 2219/00281; B01J 2219/00283; B01J 2219/00303; B01J 2219/00313; B01L 3/00; B01L 3/50; B01L 3/508; B01L 3/5085; B01L 3/50853; B01L 7/00; B01L 7/52; B01L 7/525; B01L 7/5255; B01L 7/54; B01L 2200/00; B01L 2200/06; B01L 2200/0689; B01L 2200/16; B01L 2400/00; B01L 2400/04; B01L 2400/0403; B01L 2400/0442; B01L 2400/0445; B01L 2400/0472

See application file for complete search history.

INTEGRATED TUBULAR REACTION DEVICE

CROSS-REFERENCE TO RELATED APPLICATIONS

The present application is the U.S. national stage of International Patent Application No. PCT/CN2018/105633, filed Sep. 14, 2018, which claims the benefit of priority to Chinese patent application No. 201710841427.8, filed on Sep. 18, 2017, the disclosures of which is are incorporated herein by reference in its entirety their entireties as a part of the present application.

TECHNICAL FIELD

The invention relates to the field of the biochemical reaction device, in particular to an integrated tubular reaction device capable of performing multiple simultaneous or continuous multi-step reactions, sealing the reaction device and preventing the product from causing contamination.

BACKGROUND OF THE INVENTION

With the development of biotechnology, modern molecular biology technology or genetic engineering technology is increasingly widely used in various biotechnology industries, especially in medical diagnosis. The application of these techniques often involves multiple or continuous multi-step enzymatic reactions. For example, when it is necessary to detect RNA virus, the first step is to purify the RNA from the virus, then reverse the RNA into cDNA, and finally carry out the cDNA amplification reaction. A typical DNA (or cDNA) amplification reaction is polymerase chain reaction, or PCR. In the similar multi-step enzyme reaction, the existing technology needs to carry out each step of reaction separately. Specifically, each reaction is carried out in a separate test tube and operated by hand or robot.

However, when a separate tube is used for the multi-step reaction in the process, the reaction product is transported from one tube to another, the product molecules will be exposed to the environment outside the tube, which is easy to contaminate the working environment and lead to false positive reaction in the sample test in the future. In addition, the use of separate test tube for multi-step reaction takes up a lot of space time-consuming, and using more materials, thus increasing the cost.

In order to carry out multi-step or continuous multi-step enzyme reaction more conveniently, the existing technology also provides a new technical scheme. Different steps are integrated with microfluidic technology to achieve the purpose of automated operation. Products created by microfluidic technology are often called integrated biochips. The use of integrated biochip can avoid the molecular contaminationcontamination of the product, but its structure is complex and the production cost is high. In addition, the integrated biochip has a small volume structure and does not match the volume requirement of general biological samples. Therefore, the practical value of integrated biochip is limited.

Technical Issues

In order to solve the above problems, the invention aims to provide an integrated tubular reaction device which can be used for multiple or continuous multi-step reactions, can also avoid product contamination, with practical value.

Technical Solution

To achieve the main purpose, the invention provides an integrated tubular reaction device, which comprises a reaction vessel which includes at least two tubular chambers, a channel connecting at least two tubular chambers and an opening, a cover body, which can be sealed and worked with the opening, a cover body including a through hole, a seal, which includes a sealing plug which can be worked with the through hole.

The integrated tubular reaction device of the invention is comprised of reaction vessel, cover and seal to form a closed device, which can effectively avoid contamination caused by reaction products and prevent false positive reaction. The reaction vessel and the cover can be sealed by any existing sealing method.

Among them, the cover body is provided with a through-hole which is sealed by a sealing plug. The through-hole can be used for sampling and adding sample. When sampling and adding sample are needed, only the through-hole can be opened, without the need to open the whole cover body to avoid large-area contact between the reaction system and air; when sampling and adding sample are completed, the sealing plug inserts to achieve sealing and convenient operation.

At least two tubular chambers can carry out the identical or different reactions, and the tubular chambers is preferably in a separated configuration which avoids the temperature interference caused by the proximity of the tubular chambers. At the same time, at least two tubular chambers are connected by at least one channel, the channel can be tubular or channel type, and the reaction products can be transported between the tubular chambers to realize multi-step reaction, such as two or more enzyme reactions. The transfer mode can be achieved by physical or chemical methods, such as molecular diffusion, convection or mechanical transfer, etc., which can automate multi-step biochemical enzyme reaction.

In addition, the integrated tubular reaction device of the invention integrates multiple tubular chambers into a whole, the device has a compact form factor resulting in material saving, low cost, less occupied space, easy operation with shortened operation time, thus can quickly and effectively produce valuable results with great practical value.

In one of the embodiment the channel is set up at the upper end of at least two tubular chambers, and the opening is set up at the upper end of the channel.

In this invention, at least two tubular chambers are connected by channels, and the connection part can be set up at the upper end, the middle or the lower end of the tubular chamber. The preferred configuration is to connect the upper end of the chamber, which is helpful to prevent the unintended mixing of materials between different tubular chambersBased on this preferred configurations, the opening is preferably located at the upper end of the channel, and the opening is lined up with the upper end of the tubular chamber, so that it is more convenient for sampling and adding samples into the tubular chamber through the opening of the cover body.

Other embodiments related to the configurations between the through-hole and the tubular chambers.

The number of through-hole and tubular chamber can be in identical or different numbers, and the positions of through-hole and tubular chamber can be set functionally in one to one configuration. When the opening of the cover body and the reaction vessel is working in fitting pair, the through-hole on the cover body corresponds to the tubular chamber one by one, so that each tubular chamber can be connected or sealed with the outside world independently, so as to prevent contamination, as well as more convenient for adding samples and sampling.

In one embodiment, at least one seal which also consists of a sealing rod which can be combined with at least a part of the tubular chamber. In some embodiments, the sealing rod is either fixed or movable in connection with the sealing plug.

The seal can include asealing rod which can be worked with a tubular chamber for sealing or opening the tubular chamber. Each tubular chamber can be sealed or opened independently, and can determine the separation or connection of multiple tubular chambers. The sealing rod can be fixed or movable in connection with the sealing plug. For example, the sealing rod can be moved through the sealing plug, and when the tubular chamber needs to be opened, the sealing rod can be pulled out of the sealing plug. The sealing rod can also be used for sampling before reaction.

In one of the embodiment, the reaction vessel comprises an raised arc-shaped connecting parts set up between at least two adjacent tubular chambers in the channel.

At least two adjacent tubular chambers are provided with a raised arc connector in the channel, which can avoid dead space and facilitate the transfer and exchange of reaction products between adjacent tubular chambers.

In some embodiments, the tubular chamber is cylindrical or conical, with an internal diameter of 0.1 mm to 10 mm and a wall thickness of 0.05 to 5 mm; the ratio of the depth of the tubular chamber to the internal diameter is greater than or equal to 2.

When the internal diameter of the tubular chamber is between 0.1 mm and 10 mm, and the ratio of the depth of the tubular chamber to the internal diameter is greater than or equal to 2, it can meet the needs of general enzyme reactions. The thickness of the tubular wall is between 0.05 and 5 mm, which can ensure the safety and stability, and save the cost.

In some embodiments, the integrated tubular reactor is made of transparent materials.

In the sealed state, the reaction results can be qualitatively or quantitatively detected by optical or electrical methods. The transparent material for the integrated tubular reactor is used to allow the reaction results detected by optical method, which is convenient and rapid.

In some embodiment, the reaction vessel further comprises a storage chamber for placing reaction reagents or samples, which is located on one side of the tubular chamber.

The integrated tubular reaction device can also be provided with a storage chamber which can be separated from the tubular chamber for placing reaction reagents or samples for sample addition.

In some embodiments, the same or different reagents are placed in different tubular chambers, and one or more media are filled in the channels.

The same or different reagents are placed in different tubular chambers to complete multiple reactions or reactions with different steps. The channel is filled with one or more media, which makes the tubular chamber connected in function. The transfer of reaction products in the tubular chamber can be realized by means of molecular diffusion or liquid convection. The reagent can also be stored in the tubular chamber in advance, sealed for storage and transportation, and only the sample to be tested needed to be added during use.

Beneficial Effects

The integrated tubular reaction device of the invention can be used for multiple or continuous multi-step reactions, can avoid product contamination, preventing false positive reaction, low cost, requiring less space and easy operation.

EXAMPLE OF THE INVENTION

The integrated tubular reaction device of the present invention will be further described with the figures and examples.

Figure 1:
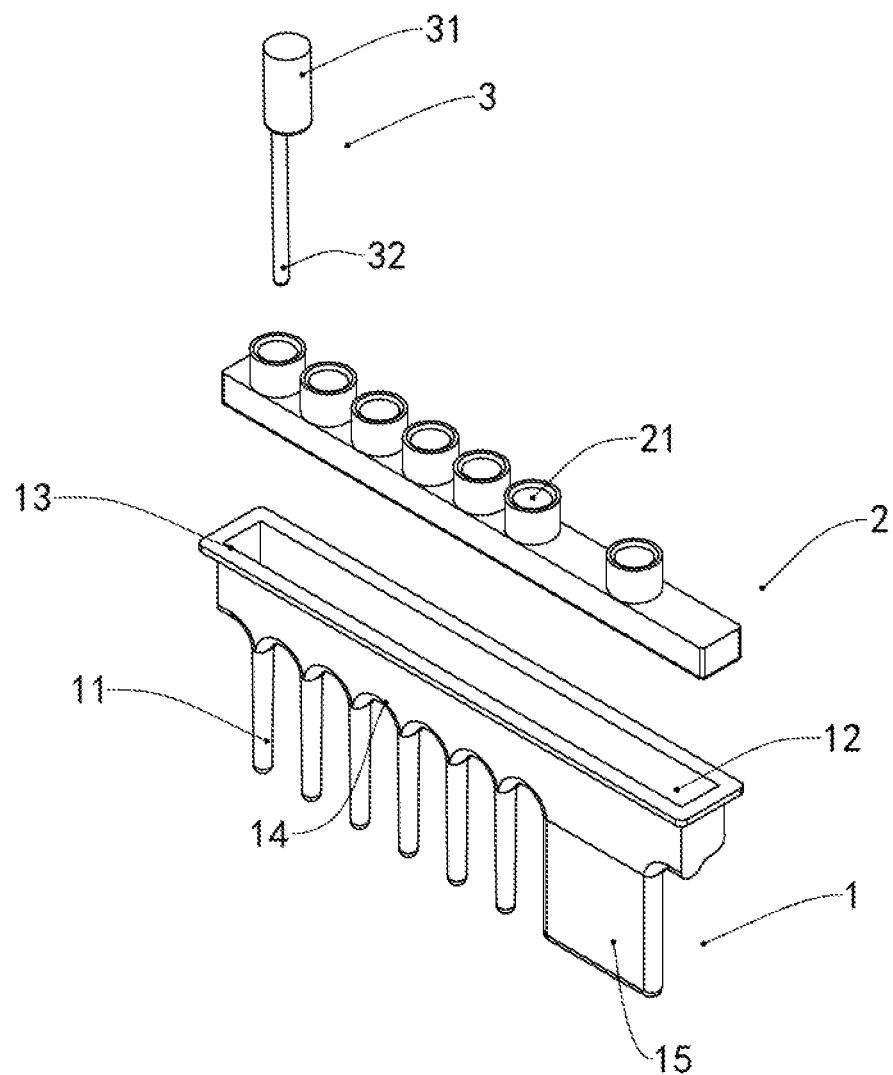
FIG. 1 is an overall structure breakdown diagram of the integrated tubular reaction device in the present invention.

As shown in FIG. 1, the integrated tubular reaction device of the example includes Reaction Vessel 1, Cover 2 and Seal 3. The Reaction Vessel 1, Cover 2 and Seal 3 form a sealed system, so as to avoid the contamination of the reaction product to the working environment, prevent the false-positive reaction, and the reagent will not contaminate the outside.

Figure 2:
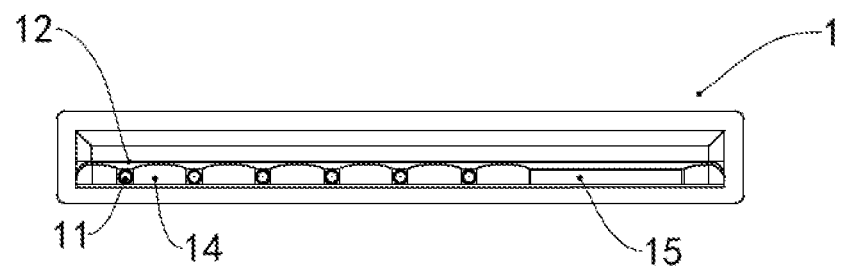
FIG. 2 is a structural diagram of the reaction vessel of the integrated tubular reaction device in the invention.
Figure 3:
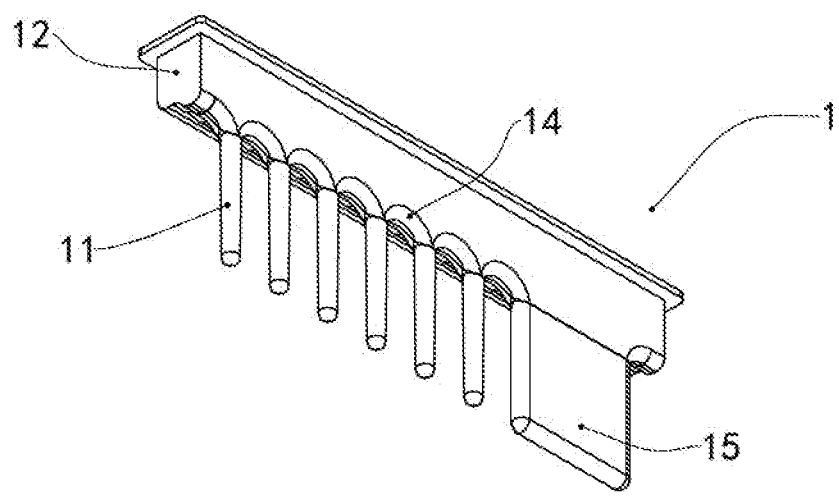
FIG. 3 is a structural diagram of the reaction vessel front side of the integrated tubular reaction device in the invention.

As shown in FIG. 2 to FIG. 3, the Reaction Vessel 1 includes at least two Tubular Chambers 11, different Tubular Chambers 11 can carry out different reactions in multi-step reactions or same reaction in multiples. The number of Tubular chambers 11 can be determined according to the actual reaction needs. The Tubular Chamber 11 may be connected by one or more Channels 12 at the upper, middle or lower ends of the Tubular Chamber 11, and the Channels 12 may enable the reaction products to be transported between the Tubular Chambers 11 under closed conditions, so as to realize the multi-step reaction. Physical or chemical methods, such as molecular diffusion, liquid convection or mechanically timed sampling, can be used to realize multi-step biochemical enzyme reaction in automated manner.

Specifically, in this example, Tubular Chambers 11 are connected by a Channel 12 at the upper end of the Tubular Chamber 11, which is conducive to preventing unnecessary mixing of reaction materials between different Tubular Chambers 11. Channel 12 can be designed into different shapes as required, such as tubular, channel, etc.

In this example, the inner diameter of the Tubular Chamber 11 is between 0.1 mm and 10 mm, and the thickness of the tube wall is between 0.05 and 5 mm; the ratio of the depth of the Tubular Chamber 11 to the inner diameter is greater than or equal to 2. When the dimension of the Tubular Chamber 11 is within the above range, it can meet the needs of general multi-step enzyme reaction, and it is safe and stable, saving cost.

Figure 4:
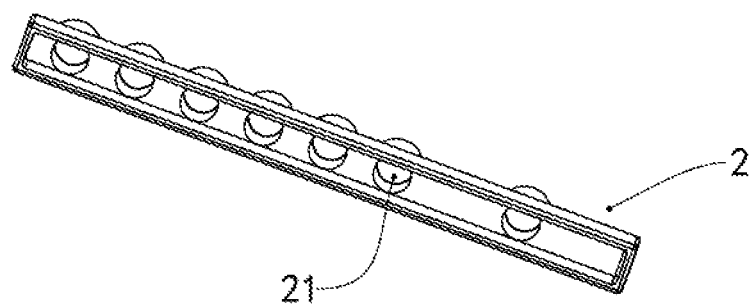
FIG. 4 is a structural diagram of the cover body of the integrated tubular reaction device in the invention.

The Reaction Vessel 1 also includes an Opening 13, in this example, the Opening 13 is located at the upper end of the Channel 12, and the Opening 13 is aligned opposite or roughly opposite to the upper end of the Tubular Chamber 11. The Opening 13 can be sealed and combined with the Cover Body 2 by any common sealing methods, such as bonding, etc. As shown in FIG. 4, the Cover Body 2 is provided with a Through Hole 21 to allow adding samples and sampling. In this example, the number of Through Holes 21 and the number of Tubular Chambers 11 are can be the same or may not be the same, and the two correspond in position and function. When the cover body is worked with the Opening 13, the Through Hole 21 is located above the Tubular Chamber 11 to allow sample addition and sampling. Seal 3 can be inserted into Through Hole 21. Each Through Hole 21 can work with a Separate or attached.

Figure 5:
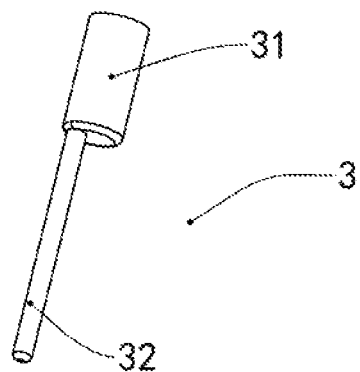
FIG. 5 is a structural diagram of the seal of the integrated tubular reaction device in the invention.

Seal 3 to open or close each Through Hole 21 independently or uniformly. As shown in FIG. 5, each Seal 3 includes a Sealing Plug 31 which can be worked with the Through Hole 21, and the Sealing Plug 31 can be worked with the Through Hole 21 in sealing. The Seal 3 can also include a Sealing Rod 32 which can be worked with at least a part of the Tubular Chamber 11. The Sealing Rod 32 is used to close or open the Tubular Chamber 11, and each Tubular Chamber 11 can be sealed or opened independently.

The Sealing Rod 32 can be fixedly or movably connected with the Sealing Plug 31. For example, the Sealing Rod 32 can move up and down through the Sealing Plug 31. o open the Tubular Chamber 11, pull the Sealing Rod 32 out of the Sealing Plug 31. The Sealing Rod 32 can be used for sample collection before a reaction, and the collected biological samples can be sent to the reactor through the Sealing Rod 32 for the reaction. For example, a sample may be collected through the bottom end of the Sealing Rod 32. For another example, the lower end of the Sealing Rod 32 may be provided with a sample rod or sample needle with a slightly smaller diameter, preferably including a rough surface in the radial direction, for adding or sampling a small amount of samples. Or a sample rod or sample needle is directly set up on the Sealing Plug 31 without the Sealing Rod 32 for sample adding and sampling.

The sample rod or sample needle can be fixedly or movably connected with the Sealing Plug 31, preferably the sample rod or sample needle can move up and down through the Sealing Plug 31, so as to lift the sample rod or sample needle after the completion of sample adding. Preferably, the end of the sample rod or sample needle is provided with a hydrophilic surface for dipping into the sample, and the hydrophilic surface can be a non completely smooth surface.

When the Sealing Rod 32 is fixedly connected with the Sealing Plug 31, the Seals 3 in an integrated tubular reaction device can configurated such that only part of the Seals 3 may be provided with the Sealing Rod 32, while other part of the Seals 3 may not be provided with the Sealing Rod 32. By using the certain Seals 3 with the Sealing Rod 32 while others without the Sealing Rod 32, the connection or partition of the Tubular Chambers 11 can be realized accordingly. Alternatively, by moving the Sealing Plug 31 with the Sealing Rod 32 up and down in the Through Hole 21, Tubular Chambers 11 can be connected or separated.

At least two adjacent Tubular Chambers 11 are provided with an raised Arc-Shaped Connecting Part 14 in the Channel 12. The Arc-Shaped Connecting Part 14 can avoid dead space and is conducive to the transfer and exchange of reaction products between adjacent Tubular Chambers 11.

In the example of the sealed integrated tubular reaction device, the reaction results can be qualitatively or quantitatively detected by optical or electrical methods. Preferably, the integrated tubular reactor is made of transparent materials such as plastic, glass, etc., so it has a transparent out surface, and the reaction results can be continuously and rapidly detected by optical methods in real time. The components of the integrated tubular reactor can be machined or injection molded.

In addition, for the convenience of the placement of the reaction reagent or sample, a Storage Chamber 15 may be set up in the Reaction Vessel 1, and the Storage Chamber 15 may be separated from the Tubular Chamber 11. For example, a Through Hole 21 can also be set up at the position corresponding to the Cover Body 2 and the Storage Chamber 15 for taking and placing reaction reagents or samples, and then sealing with the Seal 3, so as to separate the Storage Chamber 15.

The device of the example can be applied to synchronousparallele reactions or multi-step continuous reactions. When the device of the example is used for multiple simultaneous reactions, the same or different reaction reagents can be placed in different Tubular Chambers 11. When the device of the example is applied to a multi-step continuous reaction, different reaction reagents can be placed in different Tubular Chambers 11 to complete a multi-step different reaction. The reaction reagent can also be stored in the Tubular Chamber 11 in advance, for storage and transportation after being sealed. When in use, only the sample to be tested needs to be added. The Tubular Chamber 11 can also be filled with reaction reagents and biological samples manually or by automation before use. For the enzyme reaction under the sealed condition, the reagent includes enzyme, buffer, nucleic acid and other organic or inorganic ingredients.

After adding the sample and reaction reagent, the integrated tubular reaction device is sealed, and then the temperature is controlled for reaction. Generally, the enzyme reaction is between 15° C. and 99° C. Currently known methods can be used to control the temperature of the biological enzyme reaction in the tubular chamber, such as infrared light, hot/cold air, cold/hot solid or liquid substances, electromagnetic induction, etc. The sealed reaction device can be inserted into the temperature control device for reaction. According to the requirements of the reaction, any Tubular Chamber 11 can withstand constant temperature or temperatures changed periodically, and there can also be temperature in equilibrium or temperature in gradient inside the Tubular Chamber 11. For example, similar to the traditional PCR temperature control method, the temperature of the temperature control device changes periodically under the control of a computer program. For example, the temperature of the temperature control device is kept for a few seconds to a few minutes under a certain temperature, and the Tubular Chamber 11 is completely inserted into the heating part of the temperature control device. In this process, the temperature of the liquid in the Tubular Chamber 11 is basically uniform during the temperature change process. For example, in the gradient temperature control method with constant temperatures, the temperature of the temperature control device remains unchanged under the control of a computer program, and only part of the Tubular Chamber 11 contacts the heating part of the temperature control device. When the bottom is heated, the bottom temperature will be higher than the top temperature, and the liquid in the Tubular Chamber 11 will have a temperature gradient. Because the liquid with low temperature in the upper part has relatively high density or specific gravity, the liquid in the upper part and the liquid in the lower part will produce convection. The effect is to drive the molecular flow in the tubular chamber, and to undergo different temperatures, so as to meet the requirements of different enzyme reaction conditions and achieve the purpose of nucleic acid amplification in the Tubular Chamber 11. The tubular structure of the Tubular Chamber 11 brings more flexibility to the instrument design.

The molecular transport between different Tubular Chambers 11 can be carried out in active or passive manner. For example, one or more media can be filled in the Channel 12 to make the Tubular Chamber 11 functionally interlinked, and the molecular transmission in the Tubular Chamber 11 can be realized by means of molecular diffusion or liquid convection. It can also be sampling and adding samples by physical or mechanical means.

After the reaction product is transported to another Tubular Chamber 11, a second reaction can be carried out using a temperature control method similar to the above reaction.

After the completion of the reaction, the optical or electrical signals related to the product quantity are obtained by the interaction of molecular probes or affinity substances with the reaction product, so as to detect the reaction product qualitatively or quantitatively. Optical signal includes fluorescence signal, light absorption signal, infrared absorption signal, Raman scattering signal, chemiluminescence signal etc. After the reaction, the whole reaction device can be treated with high temperature or combustion to prevent product contamination.

Finally, it should be emphasized that the above is only a preferred example of the invention and is not used to limit the invention. For those skilled in the sector, the invention may have various changes and modifications. Any modification, equivalent replacement and improvement made within the spirit and principles of the invention shall be included in the protection scope of the invention.

INDUSTRIAL APPLICABILITY

As indicated above that the integrated tubular reaction device of the invention is totally sealed, which solves the contamination problem of reaction products in the multi-step biochemical enzyme reaction process. And it can complete multi-step biochemical enzyme reaction in the same device, such as nested PCR reaction, RT-PCR reaction, multi-PCR reaction, etc. it can also use molecular diffusion, convection and other methods to realize automatic multi-step biochemical enzyme reaction. The device has the advantages of low cost, requiring less space, easy operation and use, thus great practical value.

The invention claimed is:

1. An integrated tubular reaction device comprising:
   a reaction vessel comprising a plurality of tubular chambers, wherein the plurality of tubular chambers is connected with a channel and an opening;
   a cover body comprising a through-hole;
   a seal comprising a sealing plug; and
   wherein the cover body is sealed with the seal, provided with the through-hole, and worked with the opening.

2. The integrated tubular reaction device of claim 1, wherein the channel is at an upper end of the plurality of tubular chambers; and
   the opening is at an upper end of the channel.

3. The integrated tubular reaction device of claim 1, wherein the through-hole of the cover body and the plurality of tubular chambers are in configuration to align with each other.

4. The integrated tubular reaction device of claim 1, wherein the seal further comprises a sealing rod configured to seal and work with the plurality of tubular chambers.

5. The integrated tubular reaction device of claim 4, wherein the sealing rod is fixed or movable in connection with the sealing plug.

6. The integrated tubular reaction device of claim 1, wherein the reaction vessel comprises an raised arc-shaped connecting part between adjacent tubular chambers of the plurality of tubular chambers in the channel.

7. The integrated tubular reaction device of claim 1, wherein each of the plurality of tubular chambers is cylindrical or conical, with an internal diameter between 0.1 mm and 10 mm and a wall thickness between 0.05 and 5 mm; and
   ratio of depth of the each of the plurality of tubular chambers to inner diameter of the each of the plurality of tubular chambers is greater than or equal to 2.

8. The integrated tubular reaction device of claim 1, wherein the integrated tubular reaction device is made of a material comprising a transparent material.

9. The integrated tubular reaction device of claim 1, wherein the reaction vessel comprises a storage chamber for placing a reaction reagent or a sample on one side of the plurality of tubular chambers.

10. The integrated tubular reaction device of claim 1 wherein,
    each of the tubular chambers of the plurality of tubular chambers are provided with a same or a different reaction reagents to form a product in the plurality of tubular chambers.

11. The integrated tubular reaction device of claim 1, wherein the channel comprises a media.

12. The integrated tubular reaction device of claim 1, wherein each of the tubular chambers of the plurality of tubular chambers is optionally in a separated configuration to avoid a temperature interference by proximity.

13. The integrated tubular reaction device of claim 1, wherein each tubular chamber of the plurality of tubular chambers is configured to be either sealable or open independently to each other.

14. The integrated tubular reaction device of claim 1, a product of the plurality of tubular chambers is detected by an optical signal or an electrical signal or combination thereof.

15. The integrated tubular reaction device of claim 14, wherein the optical signal comprises at least one of a fluorescence signal, a light absorption signal, an infrared light absorption signal, a raman scattering signal, a chemiluminescence signal, and a combination thereof.

16. The integrated tubular reaction device of claim 1, wherein a product in the plurality of tubular chambers is configured to transfer through molecular diffusion or liquid convection.

17. The integrated tubular reaction device of claim 1, wherein a molecular transport in the plurality of tubular chambers is configured in active or passive manner.

18. A method to control a temperature in a tubular chamber comprising:
    providing the tubular chamber within a temperature control device;
    contacting a part of the tubular chamber with a heating part of the temperature control device; and
    developing a temperature gradient within the tubular chamber to drive a molecular flow in the tubular chamber.

* * * * *